(12) United States Patent
Norden

(10) Patent No.: US 10,807,441 B2
(45) Date of Patent: Oct. 20, 2020

(54) DRIVE TRAIN FOR A VEHICLE

(71) Applicant: Robert Bosch GmbH, Stuttgart (DE)

(72) Inventor: Roland Norden, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 293 days.

(21) Appl. No.: 16/062,225

(22) PCT Filed: Dec. 1, 2016

(86) PCT No.: PCT/EP2016/079374
§ 371 (c)(1),
(2) Date: Jun. 14, 2018

(87) PCT Pub. No.: WO2017/012343
PCT Pub. Date: Jun. 22, 2017

(65) Prior Publication Data
US 2020/0269659 A1     Aug. 27, 2020

(30) Foreign Application Priority Data
Dec. 14, 2015  (DE) .......................... 10 2015 225 103

(51) Int. Cl.
*B60H 1/32*     (2006.01)
*B60K 6/26*     (2007.10)
(Continued)

(52) U.S. Cl.
CPC .......... *B60H 1/3222* (2013.01); *B60H 1/143* (2013.01); *B60K 6/26* (2013.01); *B60K 25/00* (2013.01);
(Continued)

(58) Field of Classification Search
CPC ....... B60H 1/3222; B60H 1/143; B60L 1/003; B60K 25/00; B60K 6/26; B60K 6/24;
(Continued)

(56) References Cited

U.S. PATENT DOCUMENTS

2016/0193991 A1*  7/2016  Apelsmeier ............ B60H 1/004
                                                    701/22

FOREIGN PATENT DOCUMENTS

DE    10011343 A1 *  9/2001  ........... B60H 1/3222
DE    10011343 A1    9/2001
(Continued)

OTHER PUBLICATIONS

International Search Report with English translation and Written Opinion for Application No. PCT/EP2016/079374 dated Feb. 28, 2017 (13 pages).

*Primary Examiner* — Emmanuel D Duke
(74) *Attorney, Agent, or Firm* — Michael Best & Friedrich LLP

(57) ABSTRACT

The invention relates to a drive train (1), in particular for a vehicle as an electric vehicle or hybrid vehicle, comprising: an electric machine (6) for the driving or the traction of the vehicle (2); a refrigeration circuit (14), which has an air-conditioning compressor (19), an evaporator (17), a condenser (18), and an expansion valve (16), for cooling an interior (5) of the vehicle (2); and a drive unit for mechanically driving the air-conditioning compressor (19), wherein the electric machine (6) is mechanically coupled to the air-conditioning compressor (19) by means of a mechanical compressor coupling element (20) such that the electric machine (19) for the driving or the traction of the vehicle (2) is used additionally to mechanically drive the air-conditioning compressor (19).

25 Claims, 2 Drawing Sheets

(51) Int. Cl.
*B60L 1/00* (2006.01)
*B60K 25/00* (2006.01)
*B60H 1/14* (2006.01)
B60K 6/24 (2007.10)
B60K 6/28 (2007.10)

(52) U.S. Cl.
CPC ............... *B60L 1/003* (2013.01); *B60K 6/24* (2013.01); *B60K 6/28* (2013.01); *B60K 2025/005* (2013.01); *B60Y 2200/91* (2013.01); *B60Y 2200/92* (2013.01)

(58) Field of Classification Search
CPC ..................... B60K 6/28; B60K 2025/005; B60Y 2200/91; B60Y 2200/92
See application file for complete search history.

(56) References Cited

FOREIGN PATENT DOCUMENTS

| | | |
|---|---|---|
| DE | 102005022210 A1 | 11/2006 |
| DE | 102009016673 A1 | 10/2010 |
| EP | 2272701 A2 | 1/2011 |
| EP | 2520452 A2 | 11/2012 |
| JP | 2006027386 A | 2/2006 |
| JP | 2009097355 A | 5/2009 |
| JP | 2011213163 A | 10/2011 |
| JP | 2012066817 A | 4/2012 |

* cited by examiner

DRIVE TRAIN FOR A VEHICLE

BACKGROUND OF THE INVENTION

The present invention relates to a drive train and to a method for operating a drive train.

Motor vehicles which are driven only by an internal combustion engine, i.e. using fossil fuel such as gasoline or gas, have high fuel consumption. One known way of reducing the fuel consumption is to drive motor vehicles as vehicles either in the form of hybrid vehicles, using an internal combustion engine and/or an electric machine, or as vehicles in the form of pure electric vehicles, which are driven exclusively by an electric machine. While being driven by means of the electric machine, hybrid vehicles and electric vehicles do not produce enough waste heat to heat the interior. Owing to the high efficiency of the electric machine when being operated as an electric motor, the waste heat which arises at the electric machine as an electric motor is not sufficient to heat the interior. When the electric vehicle or the hybrid vehicle is being driven exclusively by means of the electric machine as an electric motor, therefore, the interior is heated by means of an additional electric resistance heater. An additional complex and expensive electric resistance heater, e.g. an additional PTC heater, is therefore disadvantageously necessary.

The electric machine and the power electronics are designed as separate modular units with separate housings for the electric machine and the power electronics. The power electronics convert the direct current from a battery into alternating current for the operation of the electric motor. For this reason, a complex power connection using corresponding electric plug connectors between the electric machine and the power electronics is necessary within the vehicle. This disadvantageously requires additional assembly effort and further parts and components. The electric machine is cooled by a cooling circuit comprising cooling fluid lines. A circulating pump circulates cooling fluid in the cooling circuit and in the cooling fluid lines, thereby enabling the waste heat from the electric machine to be dissipated at an ambient-air heat exchanger to the air in the environment. In hybrid vehicles, there is also a high-temperature cooling circuit for cooling the internal combustion engine in addition to this cooling circuit as a low-temperature cooling circuit for cooling the electric machine.

To cool the air to be fed into the interior of the vehicle, e.g. in summer at high outside temperatures, there is a refrigeration circuit comprising a mechanical air-conditioning compressor. The mechanical air-conditioning compressor is driven by a separate electric motor exclusively for driving the mechanical air-conditioning compressor. This electric motor solely for driving the mechanical air-conditioning compressor is driven by electric energy from the battery. The battery is generally a high-voltage traction battery, by means of which the electric machine for driving the vehicle with electric energy is also supplied. As a result, an additional electric motor solely for driving the air-conditioning compressor is disadvantageously necessary.

DE 10 2009 060 860 A1 shows an air-conditioning system for a vehicle having at least one refrigerant circuit and at least one temperature control circuit for controlling the temperature of a vehicle interior and having at least one vehicle component, in particular of an electric or hybrid vehicle, wherein at least one device for heat absorption from the temperature control circuit and at least one device for releasing heat to the temperature control circuit are provided.

SUMMARY OF THE INVENTION

A drive train according to the invention, in particular for a vehicle as an electric vehicle or hybrid vehicle, comprising an electric machine for the driving or traction of the vehicle, a refrigeration circuit, which has an air-conditioning compressor, an evaporator, a condenser, and an expansion valve, for cooling an interior of the vehicle, a drive unit for mechanically driving the air-conditioning compressor, wherein the electric machine for the driving or traction of the vehicle is mechanically coupled to the air-conditioning compressor by means of a mechanical compressor coupling means such that the electric machine additionally serves to mechanically drive the air-conditioning compressor, and/or the electric machine, the transmission, the air-conditioning compressor, the compressor coupling means, preferably the drive coupling means and preferably power electronics for the electric machine are combined into a modular unit and/or the electric machine, the transmission, the air-conditioning compressor, the compressor coupling means, preferably the drive coupling means and preferably the power electronics for the electric machine are arranged within a single- or multi-part common housing, and/or the drive train comprises a hydraulic cooling circuit for cooling the electric machine, and the cooling circuit comprises a cooling fluid line for the passage of a cooling fluid, a circulating pump, an electric-machine heat exchanger for transferring heat from the electric machine to the cooling fluid and an ambient-heat heat exchanger for transferring heat from the cooling fluid to the ambient air, and/or the evaporator of the refrigeration circuit is connected thermally to the power electronics in order to carry waste heat from the power electronics to the evaporator and cool the power electronics by means of the evaporator. As a result, the electric machine can be used not only for the driving or traction of the vehicle but additionally also for the driving of the mechanical air-conditioning compressor. As a result, there is advantageously no need for an additional electric motor exclusively for driving the air-conditioning compressor. It is thereby possible to lower costs and reduce the weight of the drive train.

In an additional embodiment, the mechanical compressor coupling means comprises a compressor clutch, thus enabling the mechanical coupling between the electric machine and the air-conditioning compressor to be activated and deactivated, and/or the mechanical compressor coupling means comprises a compressor shaft. Thus, the mechanical coupling between the air-conditioning compressor and the electric machine for driving the vehicle can be activated and deactivated or engaged and disengaged. If the refrigeration circuit is not required for cooling the interior at correspondingly low outside temperatures, and hence also mechanical driving of the air-conditioning compressor is not necessary, the mechanical coupling between the electric machine and the air-conditioning compressor can be divided, with the result that the mechanical energy made available by the electric machine is not used to drive the air-conditioning compressor. Thus, the mechanical coupling between the electric machine and the air-conditioning compressor is only necessary and present if the air-conditioning compressor is being operated.

In an additional embodiment, the drive train comprises a mechanical drive coupling means for coupling the electric machine mechanically to at least one driven wheel.

The mechanical drive coupling means expediently comprises a mechanical transmission and/or a drive shaft and/or a drive clutch. The mechanical coupling between the electric machine and the at least one driven wheel can be activated and deactivated by means of the drive clutch.

In an additional variant, only the air-conditioning compressor can be driven with the mechanical energy of the electric machine when a drive clutch is disengaged and a compressor clutch is engaged. While the vehicle is parked, i.e. when the vehicle is stationary, and there is a requirement for cooling in the interior, it is thus possible for the mechanical energy of the electric machine to be transferred exclusively to the air-conditioning compressor while the drive clutch is disengaged and the compressor clutch is engaged. Thus, cooling of the interior by means of the refrigeration circuit driven by the air-conditioning compressor is possible even while the vehicle is parked or stopped.

In a supplementary variant, the electric machine, the transmission, the air-conditioning compressor, the compressor coupling means, preferably the drive coupling means and preferably power electronics for the electric machine are combined into a modular unit and/or the electric machine, the transmission, the air-conditioning compressor, the compressor coupling means, preferably the drive coupling means and preferably the power electronics for the electric machine are arranged within a single- or multi-part common housing. As a result, separate housings, e.g. for the electric machine, the transmission, the air-conditioning compressor and the power electronics are advantageously unnecessary. In this modular unit, there is also already an electrical connection between the power electronics and the electric machine, and, as a result, additional lines and electric plug connectors are not required for this purpose on the motor vehicle outside the modular unit. The assembly of the motor vehicle or vehicle can thereby be made easier.

In a supplementary embodiment, the drive train comprises a hydraulic cooling circuit for cooling the electric machine, and the cooling circuit comprises a cooling fluid line for the passage of a cooling fluid, a circulating pump, and electric-machine heat exchanger for transferring heat from the electric machine to the cooling fluid and an ambient-heat heat exchanger for transferring heat from the cooling fluid to the ambient air. The cooling circuit for cooling the electric machine is a low-temperature cooling circuit.

In a supplementary embodiment, a heating heat exchanger for transferring heat from the cooling fluid to air to be introduced into the interior of the vehicle is installed in the cooling circuit. As a result, the waste heat released by the electric machine can be released by means of the heating heat exchanger to the air to be introduced into the interior of the vehicle. The waste heat from the electric machine can thus advantageously be used to heat the interior of the vehicle, thus enabling electric energy to be saved.

In an additional embodiment, the open-loop and/or closed-loop control of the electric machine by means of the power electronics can be varied in such a way at a predetermined constant rotational speed and a constant torque of the electric machine that the waste heat released by the electric machine can be varied, in particular increased, in order to obtain sufficient waste heat from the electric machine to heat the air to be introduced into the interior of the vehicle. As a result, the waste heat released by the electric machine can be varied or is variable and can hence be adapted or is adaptable to the heat requirement for the interior of the vehicle, while the operating state of the electric machine remains constant. As a result, sufficient heat to heat the interior is available from the waste heat of the electric machine, with the result that, advantageously, no additional electric resistance heater is necessary to heat the air fed into the interior. If there is no need for heat to heat the interior or the existing waste heat from the electric machine is sufficient to heat the interior, the electric machine is operated in such a way that a maximum of mechanical energy is output with a maximum efficiency from the electric energy made available. However, if the waste heat from the electric machine is no longer sufficient to heat the interior in this open loop and/or closed-loop control of the electric machine in a manner optimized and maximized in respect of mechanical energy, the open-loop and/or closed-loop control of the electric machine is changed by the power electronics in such a way that the electric machine makes available a larger quantity of waste heat. This is accomplished by corresponding, e.g. modified, energization of the electromagnets of the stator, with the result that more waste heat is available at the electromagnets and/or at the rotor while the mechanical energy output remains the same. Corresponding software for open-loop and/or closed-loop control of the electric machine for maximized power dissipation when required is stored for this purpose in the power electronics and/or in a corresponding processing unit. In terms of design, the electric machine, in particular the stator, is formed by corresponding winding of the electromagnets as coils and/or geometrical arrangement of the coils to form the rotor in such a way that variation of the waste heat released by the electric machine is controllable and/or implementable and/or is implemented by corresponding variation of the open-loop and/or closed-loop control of the electric machine, in particular of the energization of the electromagnets of the stator.

In an additional embodiment, the evaporator of the refrigeration circuit is connected thermally to the power electronics in order to carry waste heat from the power electronics to the evaporator and cool the power electronics by means of the evaporator. Cooling the power electronics by means of the refrigeration circuit makes it possible to increase the efficiency of the power electronics and extend the service life. Even in the case of high outside temperatures, e.g. in summer, the power electronics can be cooled to an optimized temperature, and therefore components of the power electronics, e.g. power semiconductors and/or a processor and/or a film capacitor, are subjected to only low thermal stresses and, as a result, the higher efficiency and longer service life of the power electronics are achieved.

In a supplementary variant, the evaporator is connected thermally to the power electronics by means of an additional cooling circuit, or the refrigeration circuit comprises an evaporator for cooling the air to be introduced into the interior of the vehicle and an additional evaporator arranged in the region of the power electronics and/or the drive train can be used to carry out a method described in this patent application, and/or the drive train comprises an internal combustion engine, and/or the drive train comprises a battery for supplying the electric machine with electric energy. By means of the internal combustion engine, at least one driven wheel of the vehicle can additionally also be driven by means of mechanical energy from the internal combustion engine. The at least one driven wheel can thus be driven by means of mechanical energy from the internal combustion engine and/or by means of mechanical energy from the electric motor. The internal combustion engine is cooled by means of a separate high-temperature cooling circuit.

In another embodiment, the high-temperature cooling circuit for the internal combustion engine comprises high-temperature cooling fluid lines, a high-temperature circulating pump, a high-temperature heat exchanger associated with the internal combustion engine, a high-temperature ambient-air heat exchanger and a high-temperature heating-air heat exchanger.

A method according to the invention for operating a drive train, in particular a drive train for a vehicle as an electric vehicle or hybrid vehicle, comprising the following steps: converting electric energy in an electric machine as an electric motor into mechanical energy and driving the vehicle with the mechanical energy produced by the electric machine, converting mechanical energy in the electric machine as a generator into electric energy in an energy recovery mode of the vehicle, driving an air-conditioning compressor of a refrigeration circuit with mechanical energy and cooling the air introduced into an interior with an evaporator of the refrigeration circuit, wherein the air-conditioning compressor is driven with mechanical energy produced by the electric machine as an electric motor for the driving of the vehicle, and/or waste heat from the electric machine is released by means of a hydraulic cooling circuit to air introduced into the interior of the vehicle, and/or the vehicle and/or the air-conditioning compressor is/are driven by means of the electric machine, of which there is preferably only one, for driving the vehicle.

In a supplementary embodiment, the air-conditioning compressor is driven with kinetic energy of the vehicle during a thermal energy recovery mode, and/or the vehicle and the air-conditioning compressor are driven, in particular simultaneously, with the mechanical energy of the electric machine as an electric motor. The air-conditioning compressor can be mechanically coupled to the electric machine by means of the compressor coupling means. In an energy recovery mode of the vehicle, electric energy can thus be produced by means of the electric machine, and/or it is possible, owing to the mechanical coupling to the air-conditioning compressor, to use the mechanical energy to drive the air-conditioning compressor by means of kinetic energy of the vehicle and thereby perform cooling of the interior of the vehicle with kinetic energy of the vehicle during the thermal energy recovery mode. It is thereby possible to additionally optimize the overall efficiency of the vehicle.

In a supplementary embodiment, waste heat from the electric machine is released by means of a hydraulic cooling circuit to air introduced into the interior of the vehicle. As a result, the waste heat from the electric machine can also be used to heat the interior. Additional optimization of the efficiency of the vehicle is thereby possible.

In a supplementary variant, during a constant rotational speed and a constant torque output by the electric machine, the waste heat released by the electric machine to the cooling circuit is varied, in particular increased, in order to obtain sufficient waste heat from the electric machine to heat the air introduced into the interior of the vehicle, and/or the quantity of heat released by the cooling circuit to the ambient-air heat exchanger and/or the heating heat exchanger is subjected to open-loop and/or closed-loop control using an open-loop and/or closed-loop control means, and/or the method is carried out with a drive train described in this patent application. The waste heat from the electric machine can be varied in a constant operating state and hence adapted to the heat requirement for heating the interior. As a result, there is advantageously no need for an additional electric resistance heater to heat the air to be fed to the interior. The quantity of heat released by the cooling circuit to the ambient-air heat exchanger and/or to the heating heat exchanger can be subjected to open-loop and/or closed-loop control using the open-loop and/or closed-loop control means, e.g. at least one check valve or one 3-way valve. Depending on the need for heat to heat the interior, the waste heat from the electric machine can thereby be fed either to the heating heat exchanger and/or to the ambient-air heat exchanger. If there is no need for heat to heat the interior, all the waste heat from the electric machine is thus released to the air in the environment by means of the ambient-air heat exchanger.

BRIEF DESCRIPTION OF THE DRAWINGS

Illustrative embodiments of the invention are explained in greater detail below with reference to the attached drawings, in which.

DETAILED DESCRIPTION

Figure 3:
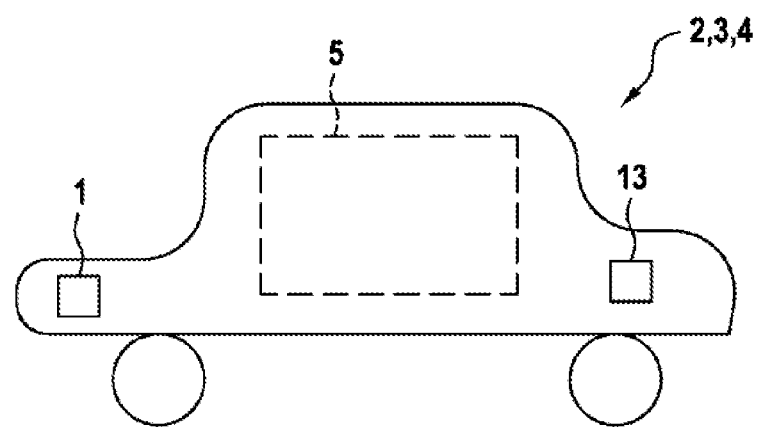
FIG. 3 shows a view of a vehicle as an electric vehicle or hybrid vehicle.

A vehicle 2 illustrated in FIG. 3 has a drive train 1 for the driving or traction of the vehicle 2. A battery 13 as a high-voltage battery 13, e.g. a lithium-ion battery 13, is used to supply the drive train 1 with electric energy. If the drive train 1 has both an electric machine 6 and an internal combustion engine 45 for driving the vehicle 2, the vehicle is a hybrid vehicle 4 and, if the drive train 1 has only an electric machine 6 for driving the vehicle 2, the vehicle is an electric vehicle 3.

Figure 1:
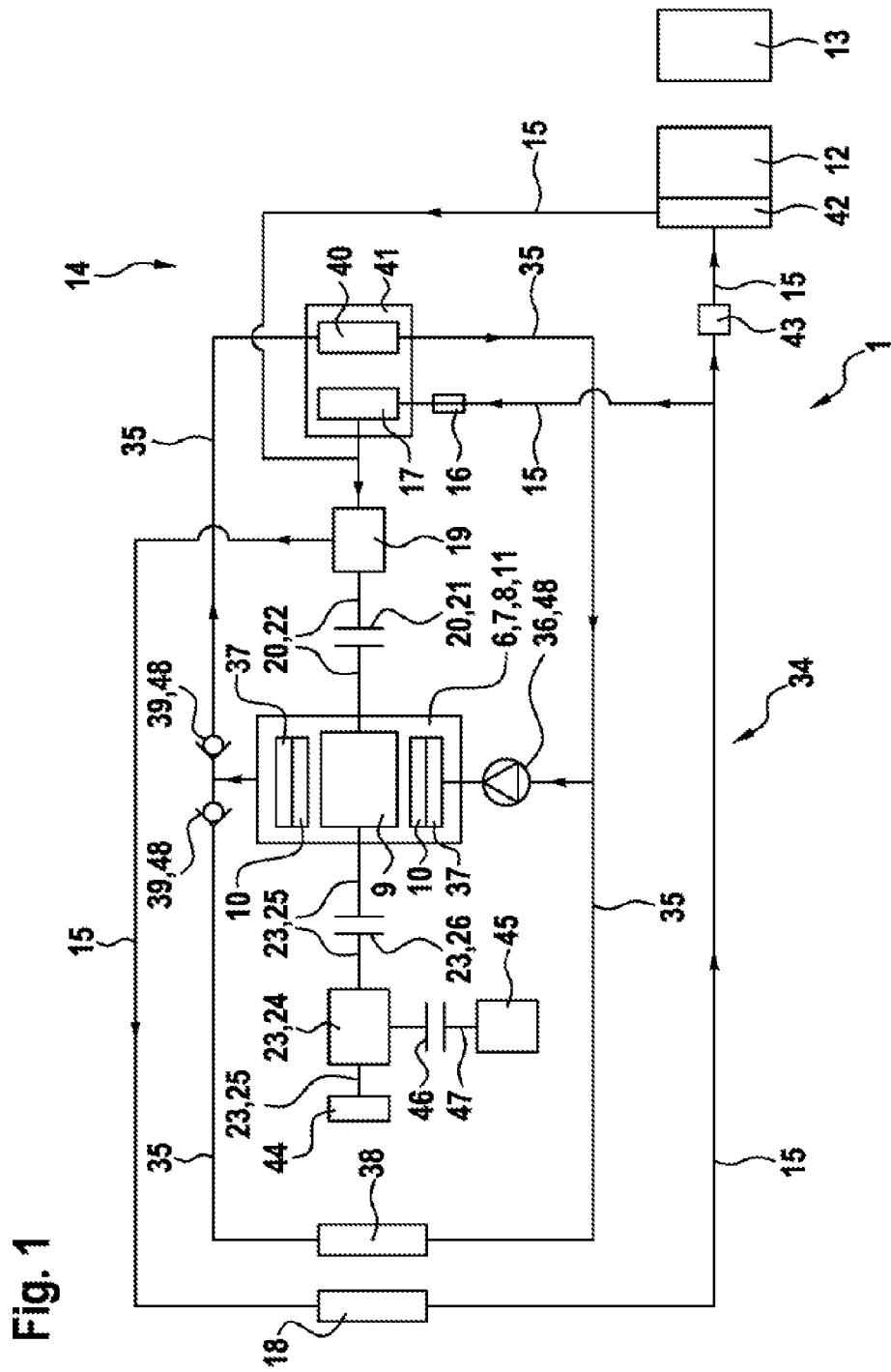
FIG. 1 shows a schematic illustration of a drive train.

In FIG. 1, the drive train 1 is illustrated in greatly schematized form. The electric machine 6 comprises a rotor 9 and a stator 10 having electromagnets. The electric machine 6 can convert electric energy from the battery 13 into mechanical energy as an electric motor 7 or can convert mechanical energy into electric energy as a generator 8 in an energy recovery mode of the vehicle 2 in order to charge the battery 13 in the energy recovery mode. An electric-machine heat exchanger 37 is furthermore arranged within an electric machine housing 11 of the electric machine 6. A compressor shaft 22 is secured as a compressor coupling means 20 on one side of the rotor 9. There is furthermore a compressor clutch 21 on the compressor shaft 22, and the compressor shaft 22 is mechanically coupled to an air-conditioning compressor 19 of a refrigeration circuit 14. When the compressor clutch 21 is engaged, there is a mechanical coupling or connection between the rotor 9 and the mechanical air-conditioning compressor 19, with the result that the air-conditioning compressor 19 is driven by means of mechanical energy which is transferred to the air-conditioning compressor 19 by the rotor 9 and the compressor shaft 22. In a disengaged state of the compressor clutch 21, there is no mechanical coupling between the rotor 9 or the electric machine 6 and the air-conditioning compressor 19.

In addition to the air-conditioning compressor 19 or compressor 19, the refrigeration circuit 14 comprises refrigerant lines 15, an expansion valve 16, an evaporator 17, a condenser 18, an additional expansion valve 43 and an additional evaporator 42. The evaporator 17 is arranged within an air-conditioning system 41 and is used to cool the air that is to be introduced or has been introduced into an interior 5 of the vehicle 2. The interior 5 can thus be cooled by means of the evaporator 17.

On another side of the rotor 9, the rotor 9 is connected to a driven wheel 44 by means of a drive coupling means 23. In this case, the drive coupling means 23 comprises a drive shaft 25, a mechanical transmission 24, e.g. a differential transmission 24, and a drive clutch 26. In an engaged state of the drive clutch 26, there is a mechanical coupling between the rotor 9 of the electric machine 6 and the driven wheel 44. When the drive clutch 26 is disengaged, there is no mechanical coupling or connection between the electric machine 6 and the driven wheel 44. The drive train 1 furthermore optionally comprises an internal combustion engine 45, which, by means of an internal combustion engine shaft 47 and an internal combustion engine clutch 46, is respectively connected mechanically to the transmission 24 and hence also to the driven wheel 44 of the vehicle 2 or, in the case of a disengaged internal combustion engine clutch 46, the mechanical coupling between the internal combustion engine 45 and the at least one driven wheel 44 is interrupted.

During the operation of the electric machine 6, waste heat is released by the electric machine 6. Here, the waste heat is released to a cooling circuit 34 by the electric-machine heat exchanger 37 within the electric machine housing 11. The cooling circuit 34 comprises cooling fluid lines 35 containing cooling fluid, and the cooling fluid is circulated by a circulating pump 36. The cooling circuit 34 furthermore comprises an ambient-air heat exchanger 38 for transmitting waste heat in the cooling fluid of the cooling circuit 34 to the ambient air. Also installed in the cooling circuit 34 is a heating heat exchanger 40, with the result that the waste heat from the electric machine 6 is released by means of the heating heat exchanger 40 into the air introduced into the interior 5. The heating heat exchanger 40 is arranged within the air-conditioning system 41 together with the evaporator 17. The distribution of the waste heat from the electric machine 6, which is released to the air in the environment by means of the ambient-air heat exchanger 38 and/or to the air in the interior 5 by means of the heating heat exchanger 40, can be subjected to open-loop and/or closed-loop control by means of an open-loop and/or closed-loop control means 48. The open-loop and/or closed-loop control means 48 comprises two check valves 39 and the recirculating pump 36. In the pumping direction of the recirculating pump 36 which is illustrated in FIG. 1, the cooling fluid emerging from the electric machine 6 is introduced exclusively into the heating heat exchanger 40 and, from there, is passed back to the electric machine 6. The circulating pump 36 can also pass cooling fluid through the cooling circuit 34 in a delivery direction opposite to that in the illustration in FIG. 1, with the result that, in this opposite direction (not shown), the cooling fluid emerging from the electric machine 6 is passed exclusively into the ambient-air heat exchanger 38 by virtue of the design of the two check valves 39. By means of corresponding open-loop and/or closed-loop control of the times in which the circulating pump 36 pumps the cooling fluid either in the delivery direction illustrated in FIG. 1 or counter to the delivery direction illustrated in FIG. 1, the allocation of the waste heat from the electric machine 6 to the ambient-air heat exchanger 38 and/or the heating heat exchanger 40 can be subjected to open-loop and/or closed-loop control. As a departure therefrom (not shown), the open-loop and/or closed-loop control means 48 can also be a corresponding 3-way valve, by means of which the volume flow of the cooling liquid emerging from the electric machine 6 can be allocated to the ambient-air heat exchanger 38 and/or the heating heat exchanger 40, and therefore the circulating pump 36 has to be operated in only one delivery direction in this variant that is not illustrated.

In the case of a disengaged drive coupling means 23 and an engaged compressor clutch 21, the air-conditioning compressor 19 can be driven by means of the electric machine 6 even when the vehicle 2 is parked or stopped. If there is no need for cooling in the interior 5, it is possible, with a disengaged compressor clutch 21 and an engaged drive coupling means 23, to use the mechanical energy of the electric machine 6 exclusively to drive the vehicle 2. In an energy recovery mode of the vehicle 2 while the compressor clutch 21 is disengaged and a drive coupling means 23 is engaged, it is possible, in a thermal energy recovery mode, for the kinetic energy of the vehicle also to be used to drive the air-conditioning compressor 19 and thereby for the efficiency of the vehicle 2 to be additionally improved. In the thermal energy recovery mode, there is therefore a need for cooling of the interior 5. By means of the refrigeration circuit 14 and of the additional evaporator 42 on power electronics 12 for supplying power to the electric machine 6 and by means of the additional expansion valve 43, it is additionally also possible to cool the power electronics 12 by means of the refrigeration circuit 14. Arranged in the refrigeration circuit 14 is a corresponding valve (not shown), by means of which the refrigerant in the refrigeration circuit 14 can be passed either only through the evaporator 17, only through the additional evaporator 42 or simultaneously through the evaporator 17 and the additional evaporator 42.

Figure 2:
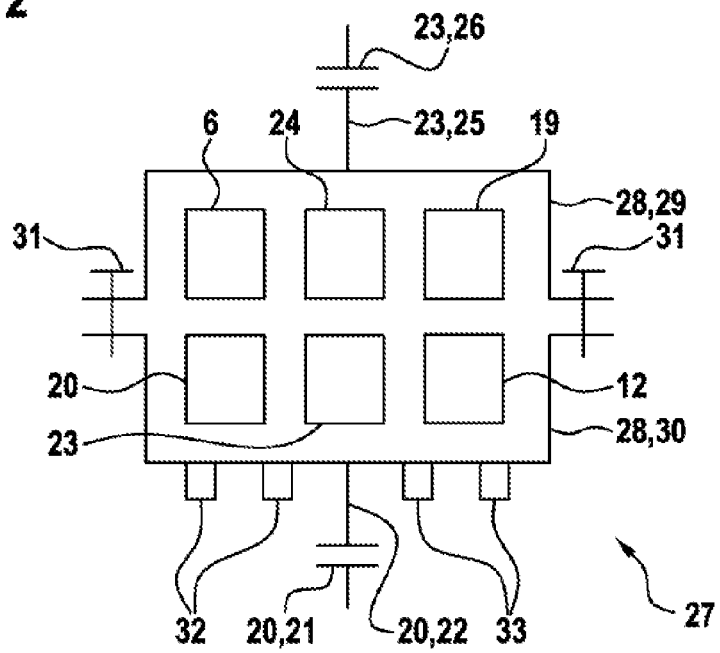
FIG. 2 shows a greatly simplified section through a modular unit comprising an electric machine, a transmission, an air-conditioning compressor, a compressor coupling means, a drive coupling means and power electronics for the electric machine.

The electric machine 6, the air-conditioning compressor 19, the transmission 14, the compressor coupling means 20, the drive coupling means 23 and the power electronics 12 are arranged in a modular unit 27 having a common housing 28 (FIG. 2). The housing 28 is in two parts and comprises a first part 29 and a second part 30. The two parts 29, 30 of the housing 28 are connected to one another by means of a connection means 31, e.g. screw connections. Both the drive shaft 25 and the compressor shaft 23 are passed through the housing 28 of the modular unit 27. Two interfaces 32 for connecting the modular unit 27 to two refrigerant lines 15 of the refrigeration circuit 14 are furthermore also formed on the outside of the housing 28. There are furthermore two interfaces 33 for connecting the modular unit 27 hydraulically to two cooling fluid lines 35 of the cooling circuit 34. The interfaces 32, 33 are connection stubs and/or screw connections and/or bayonet connections, for example. During the production and assembly of the vehicle 2, this allows high integration of the components 6, 12, 19, 20, 23, 24. It is thereby possible to improve the safety of the vehicle 2 by virtue of the integration of high-voltage components, i.e. the power electronics 12 and the electric machine 6.

Considered overall, significant advantages are associated with the drive train 1 according to the invention and the method according to the invention for operating the drive train 1. The electric machine 6 can also be used to drive the air-conditioning compressor 19, and this is also possible while the vehicle 2 is stopped. As a result, there is advantageously no need for an additional electric motor for exclusive driving of the air-conditioning compressor 19. It is thereby advantageously possible to save costs and weight in the production of the drive train 1. By virtue of the capacity for open-loop and/or closed-loop control of the waste heat produced by the electric machine 6, the waste heat produced by the electric machine 6 is sufficient for heating the interior 5, with the result that no additional electric resistance heater is required to heat the air introduced into the interior 5. It is thereby possible to save additional costs and weight since no electric resistance heater is required to heat the air introduced into the interior 5.

The invention claimed is:

1. A drive train, comprising an electric machine for driving or traction of the vehicle, a refrigeration circuit, which has an air-conditioning compressor, an evaporator, a condenser, and an expansion valve, for cooling an interior of the vehicle, and a drive unit for mechanically driving the air-conditioning compressor, wherein the electric machine is mechanically coupled to the air-conditioning compressor by a mechanical compressor coupling means such that the electric machine additionally serves to mechanically drive the air-conditioning compressor.

2. The drive train as claimed in claim 1, wherein the mechanical compressor coupling means comprises a compressor clutch, thus enabling the mechanical coupling between the electric machine and the air-conditioning compressor to be activated and deactivated.

3. The drive train as claimed in claim 1, wherein the drive train comprises a mechanical drive coupling means for coupling the electric machine mechanically to at least one driven wheel.

4. The drive train as claimed in claim 3, wherein the mechanical drive coupling means comprises a mechanical transmission and/or a drive shaft and/or a drive clutch.

5. The drive train as claimed in claim 4, wherein the mechanical drive coupling means comprises a drive clutch, and wherein only the air-conditioning compressor can be driven with the mechanical energy of the electric machine when the drive clutch is disengaged and a compressor clutch is engaged.

6. The drive train as claimed in claim 1, wherein the electric machine, the transmission, the air-conditioning compressor, and the compressor coupling means, are combined into a modular unit.

7. The drive train as claimed in claim 1, wherein the drive train comprises a hydraulic cooling circuit for cooling the electric machine, and the cooling circuit comprises a cooling fluid line for the passage of a cooling fluid, a circulating pump, an electric-machine heat exchanger for transferring heat from the electric machine to the cooling fluid and an ambient-heat heat exchanger for transferring heat from the cooling fluid to the ambient air.

8. The drive train as claimed in claim 7, further comprising a heating heat exchanger for transferring heat from the cooling fluid to air to be introduced into the interior of the vehicle is installed in the cooling circuit.

9. The drive train as claimed in claim 7, further comprising a power electronics for open-loop and/or closed-loop control of the electric machine, wherein the power electronics is configured to vary the open-loop or closed-loop control at a predetermined constant rotational speed and a constant torque of the electric machine that a waste heat released by the electric machine can be increased, in order to obtain sufficient waste heat from the electric machine to heat the air to be introduced into the interior of the vehicle.

10. The drive train as claimed in claim 9, wherein the evaporator of the refrigeration circuit is connected thermally to the power electronics in order to carry a waste heat from the power electronics to the evaporator and cool the power electronics by means of the evaporator.

11. The drive train as claimed in claim 9, wherein the refrigeration circuit comprises an additional evaporator arranged in a region of the power electronics.

12. The drive train as claimed in claim 9, wherein the drive train comprises an internal combustion engine.

13. The drive train as claimed in claim 9, wherein the drive train comprises a battery for supplying the electric machine with electric energy.

14. The drive train as claimed in claim 1, wherein the mechanical compressor coupling means comprises a compressor shaft.

15. The drive train as claimed in claim 1, wherein the electric machine, the transmission, the air-conditioning compressor, the compressor coupling means, the drive coupling means and power electronics for the electric machine are combined into a modular unit.

16. The drive train as claimed in claim 1, wherein the electric machine, the transmission, the air-conditioning compressor, and the compressor coupling means are arranged within a single- or multi-part common housing.

17. The drive train as claimed in claim 1, wherein the electric machine, the transmission, the air-conditioning compressor, the compressor coupling means, the drive coupling means and the power electronics for the electric machine are arranged within a single- or multi-part common housing.

18. A method for operating a drive train, for a vehicle, comprising the following steps: converting electric energy in an electric machine as an electric motor into mechanical energy and driving the vehicle with the mechanical energy produced by the electric machine, converting mechanical energy in the electric machine as a generator into electric energy in an energy recovery mode of the vehicle, driving an air-conditioning compressor of a refrigeration circuit with mechanical energy and cooling the air introduced into an interior with an evaporator of the refrigeration circuit (14), and driving the air-conditioning compressor with mechanical energy produced by the electric machine as an electric motor for driving or traction of the vehicle.

19. The method as claimed in claim 18, wherein the air-conditioning compressor is driven with kinetic energy of the vehicle during a thermal energy recovery mode.

20. The method as claimed in claim 18, wherein the waste heat from the electric machine is released by a hydraulic cooling circuit to air introduced into the interior of the vehicle.

21. The method as claimed in claim 18, wherein during a constant rotational speed and a constant torque output by the electric machine, the waste heat released by the electric machine to the cooling circuit is increased, in order to obtain sufficient waste heat from the electric machine to heat the air introduced into the interior of the vehicle and/or the quantity of heat released by the cooling circuit to an ambient-air heat exchanger.

22. The method as claimed in claim 18, wherein the vehicle and the air-conditioning compressor are driven with the mechanical energy of the electric machine as an electric motor.

23. The method as claimed in claim 18, wherein the vehicle and the air-conditioning compressor are driven simultaneously with the mechanical energy of the electric machine as an electric motor.

24. The method as claimed in claim 18, further comprising a heating heat exchanger is subjected to open-loop and/or closed-loop control using an open-loop and/or closed-loop control means.

25. The method as claimed in claim 18, wherein the method is carried out with a drive train comprising an electric machine for driving or traction of the vehicle, a refrigeration circuit, which has an air-conditioning compressor, an evaporator, a condenser, and an expansion valve, for cooling an interior of the vehicle, and a drive unit for mechanically driving the air-conditioning compressor, wherein the electric machine is mechanically coupled to the air-conditioning compressor by a mechanical compressor coupling means such that the electric machine additionally serves to mechanically drive the air-conditioning compressor.

* * * * *